US 012192771B2

(12) United States Patent
Sadaramachandra et al.

(10) Patent No.: US 12,192,771 B2
(45) Date of Patent: Jan. 7, 2025

(54) COLLABORATIVE WIRELESS INTRUSION PROTECTION SYSTEM

(71) Applicant: Ruckus IP Holdings LLC, Claremont, NC (US)

(72) Inventors: Raghavendra Sadaramachandra, Sunnyvale, CA (US); Wen Chen, San Jose, CA (US)

(73) Assignee: Ruckus IP Holdings LLC, Claremont, NC (US)

( * ) Notice: Subject to any disclaimer, the term of this patent is extended or adjusted under 35 U.S.C. 154(b) by 279 days.

(21) Appl. No.: 17/785,519

(22) PCT Filed: Dec. 14, 2020

(86) PCT No.: PCT/US2020/064762
§ 371 (c)(1),
(2) Date: Jun. 15, 2022

(87) PCT Pub. No.: WO2021/141728
PCT Pub. Date: Jul. 15, 2021

(65) Prior Publication Data
US 2023/0031634 A1 Feb. 2, 2023

Related U.S. Application Data

(60) Provisional application No. 62/958,675, filed on Jan. 8, 2020.

(51) Int. Cl.
*H04W 12/122* (2021.01)
*H04W 84/12* (2009.01)

(52) U.S. Cl.
CPC .......... *H04W 12/122* (2021.01); *H04W 84/12* (2013.01)

(58) Field of Classification Search
CPC .. H04W 12/122; H04W 84/12; H04L 63/1416
See application file for complete search history.

(56) References Cited

U.S. PATENT DOCUMENTS

2005/0171720 A1* 8/2005 Olson ................. H04W 12/122
702/121
2006/0236391 A1* 10/2006 Kim .................... H04L 63/1466
726/22

(Continued)

OTHER PUBLICATIONS

A. Yin et al., "Detecting Protected Layer-3 Rogue APs", Sep. 2007, Fourth International Conference on Broadband Communications, Networks and Systems, pp. 449-458 (Year: 2007).*

(Continued)

*Primary Examiner* — Kenneth W Chang
(74) *Attorney, Agent, or Firm* — Steven Stupp (57) ABSTRACT

A controller may receive information identifying a rogue access point operating on a channel in the WLAN. In response, the controller may provide instructions to at least a subset of the access points, where the instructions indicate that at least the subset of the access points collaboratively attack the rogue access point, and where a given instruction for a given access point specifies a schedule of attacks by the given access point. In some embodiments, the controller selects at least the subset of the access points based at least in part on one or more parameters, including: an ability to receive transmissions from the rogue access point; traffic loading; communication performance; a number of associated electronic devices; proximity to the rogue access point; and/or operating channels.

20 Claims, 6 Drawing Sheets

(56) References Cited

U.S. PATENT DOCUMENTS

| | | |
|---|---|---|
| 2007/0217371 A1 | 9/2007 | Sinha |
| 2008/0101283 A1 | 5/2008 | Calhoun et al. |
| 2009/0271684 A1 | 10/2009 | Dietrich et al. |
| 2009/0271864 A1 | 10/2009 | Dietrich et al. |
| 2014/0245441 A1* | 8/2014 | Lee .................... H04L 63/1433 726/25 |
| 2014/0282905 A1* | 9/2014 | Iyer ...................... H04W 12/08 726/4 |
| 2015/0082429 A1* | 3/2015 | Rangarajan ......... H04W 12/122 726/23 |

OTHER PUBLICATIONS

"Notification of Transmittal of the International Search Report and the Written Opinion of the International Searching Authority, or the Declaration for corresponding International Application No. PCT/US2020/064762, mailing date: Mar. 3, 2021, (14 pages)".

"International Search Report and the Written Opinion of the International Searching Authority, or the Declaration", in corresponding patent application No. PCT/US2020/064762, Mar. 3, 2021, 12 pages.

* cited by examiner

COLLABORATIVE WIRELESS INTRUSION PROTECTION SYSTEM

CROSS REFERENCE TO RELATED APPLICATIONS

This application claims priority under 35 U.S.C. 371 to International Application No. PCT/US2020/64762, "Collaborative Wireless Intrusion Protection System," by Raghavendra Sadaramachandra, et al., filed on Dec. 14, 2020, which claims priority to U.S. Provisional Patent Application Ser. No. 62/958,675, "Collaborative Wireless Intrusion Protection System," by Raghavendra Sadaramachandra, et al., filed on Jan. 8, 2020, the contents of both of which are herein incorporated by reference.

BACKGROUND

Field

The described embodiments relate to techniques for detecting a rogue access point and/or collaboratively preventing malicious behavior in a wireless local area network (WLAN).

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Washington), and/or another type of wireless network.

In a WLAN based on an IEEE 802.11 standard, one or more electronic devices (which are sometimes referred to as stations, clients or recipient electronic devices) discover, associate with and communicate with one or more access points.

However, sometimes an access point (which is henceforth referred to as a 'rogue access point') in a WLAN is operated without authorization from a network administrator. Notably, a rogue access point may be added to the WLAN h a malicious attacker to intentionally degrade the communication performance and, thus, the user experience. For example, a rogue access point may be added by a competitor. Alternatively, a smartphone user may configure their phone to operate as a hotspot, so that other client devices can share the WLN. In the process, the WLAN bandwidth may be reduced. Indeed, such malicious activity may cause the WLAN to shut down. Consequently, the presence of a rogue access point in a WLAN can disrupt service and/or may pose a security threat.

SUMMARY

A first group of described embodiments relates to a controller. This controller includes an interface circuit that communicates access points in a WLAN. During operation, the controller receives, at the interface circuit, information identifying a rogue access point operating on a channel in the WLAN. In response, the controller provides, from the interface circuit, instructions addressed to at least a subset of the access points, where the instructions indicate that at least the subset of the access points collaboratively attack the rogue access point, and where a given instruction for a given access point specifies a schedule of attacks by the given access point.

Note that the information may be provided by one or more of the access points.

Moreover, the schedule may include time intervals when the given access point attacks the rogue access point. For example, the time intervals may be periodic. When the given access point attacks the rogue access point, note that a remainder of the access points in at least the subset of the access points may not attack the rogue access point.

Furthermore, the given instruction may indicate that, during an instance of an attack, the given access point transitions from an operating channel of the given access point to the channel and transmits de-authentication messages associated with the rogue access point (such as broadcast de-authentication messages). For example, the de-authentication messages may include an identifier of the rogue access point. Then, after a time interval, the given access point may transition from the channel to the operating channel of the given access point.

Additionally, the controller may select at least the subset of the access points. For example, at least the subset of the access points may have previously reported receiving transmissions associated with the rogue access point. Alternatively, the controller may select at least the subset of the access points based at least in part on one or more of: loading of at least the subset of the access points; communication performance of at least the subset of the access points; a number of electronic devices associated with at least the subset of the access points; and/or proximity of at least the subset of the access points to the rogue access point (which may be determined using received signal strengths of the rogue access point by at least the subset of the access points).

In some embodiments, operating channels of at least the subset of the access points are the same as the channel.

Another embodiment provides an access point that performs counterpart operations to at least some of the operations of the controller.

Another embodiment provides a computer-readable storage medium for use with the controller. This computer-readable storage medium may include program instructions that, when executed by the controller, cause the controller to perform at least some of the aforementioned operations.

Another embodiment provides a method. This method includes at least some of the operations performed by the controller.

A second group of described embodiments relates to an access point. This access point includes an interface circuit that communicates with other access points in a WLAN and a controller of the access point and the other access points in the WLAN. During operation, the access point receives, at the interface circuit, information identifying a rogue access point operating on a channel in the WLAN. Based at least in part on the information, the access point provides, from the interface circuit, attacks in the channel on the rogue access point, where the attacks are performed in coordination with at least a subset of the access points.

Note that the information may be associated with (e.g., received from) the controller and/or from at least the subset of the access points. Alternatively, the access point may receive the information from the rogue access point, and the access point may identify the rogue access point based at least in part on the information.

Moreover, at least the access point may select at least the subset of the access points, and may communicate, from the interface circuit, assignment information addressed to at least the subset of the access points, where the assignment information specifies at least the subset of the access points. For example, at least the subset of the access points may have previously reported receiving transmissions associated with the rogue access point. Alternatively, the access point may, at least in part, select at least the subset of the access points based at least in part on one or more of: loading of at least the subset of the access points; communication performance of at least the subset of the access points; a number of electronic devices associated with at least the subset of the access points; and/or proximity of at least the subset of the access points to the rogue access point (which may be determined using received signal strengths of the rogue access point by at least the subset of the access points).

In some embodiments, operating channels of at least the subset of the access points are the same as the channel.

Moreover, the information may include a schedule with time interval when the access point attacks the rogue access point. For example, the time intervals may be periodic. When the access point attacks the rogue access point, note that a remainder of the access points in at least the subset of the access points may not attack the rogue access point.

Furthermore, the instruction may indicate that, during an instance of an attack, the access point transitions from an operating channel of the access point to the channel and transmits de-authentication messages associated with the rogue access point (such as broadcast de-authentication messages). For example, the de-authentication messages may include an identifier of the rogue access point. Then, after a time interval, the access point may transition from the channel to the operating channel of the access point.

Additionally, when the information is associated with the controller and indicates that the access point is included in at least the subset of the access points, the access point may provide, from the interface circuit, one or more requests addressed to one or more of the access points, where a given request indicates that a given one of the one or more of the access points replace the access point in at least the subset of the access points. For example, the access point may determine when to provide the one or more requests based at least in part on: when the one or more of the access points have previously reported receiving transmissions associated with the rogue access point; a comparison of loading of the one or more of the access points and the access point, a comparison of communication performance of the one or more of the access points and the access point; numbers of electronic devices associated with the one or more of the access points and the access point; and/or relative proximity of the one or more of the access points and the access point to the rogue access point. In some embodiments, operating channels of the one or more of the access points are the same as the channel.

Another embodiment provides a controller that performs counterpart operations to at least some of the operations of the access point.

Another embodiment provides a computer-readable storage medium for use with the access point. This computer-readable storage medium may include program instructions that, when executed by the access point, cause the access point to perform at least some of the aforementioned operations.

Another embodiment provides a method. This method includes at least some of the operations performed by the access point.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In a first group of embodiments, a controller that facilitates collaborative attacks that are directed at a rogue access point in a WLAN is described. During operation, the controller may receive information identifying a rogue access point operating on a channel in the WLAN. In response, the controller may provide instructions to at least a subset of the access points, where the instructions indicate that at least the subset of the access points collaboratively attack the rogue access point, and where a given instruction for a given access point specifies a schedule of attacks by the given access point. In some embodiments, the controller selects at least the subset of the access points based at least in part on one or more parameters, including: having previously reported receiving transmissions associated with the rogue access point; the traffic loading of at least the subset of the access points; communication performance of at least the subset of the access points; a number of electronic devices associated with at least the subset of the access points; proximity of at least the subset of the access points to the rogue access point; and/or whether operating channels of at least the subset of the access points are the same as the channel.

Note that the schedule may include time intervals when the given access point attacks the rogue access point and a remainder of the access points in at least the subset of the access points may not attack the rogue access point. Furthermore, during an instance of an attack, the given access point transitions from an operating channel of the given access point to the channel on which the rogue access point is operating and transmits de-authentication messages associated with the rogue access point. For example, the de-authentication messages may include an identifier of the rogue access point. Then, after a time interval, the given access point may transition from the channel to the operating channel of the given access point.

In a second group of embodiments, an access point that facilitates collaborative attacks that are directed at a rogue access point in a WLAN is described. During operation, the access point may receive information identifying a rogue access point that is operating on a channel in the WLAN. Based at least in part on the information, the access point may provide attacks in the channel on the rogue access point, where the attacks are performed in coordination with at least a subset of access points in the WLAN. Note that the information may be associated with (e.g., received from) a controller and/or from at least the subset of the access points. Alternatively, the access point may receive the information from the rogue access point, and the access point may identify the rogue access point based at least in part on the information. In some embodiments, at least the access point may select at least the subset of the access points based at least in part on the one or more parameters, and may communicate assignment information to at least the subset of the access points, where the assignment information specifies at least the subset of the access points.

By facilitating collaborative attacks on the rogue access point in the WLAN (and, more generally, in a venue or a deployment), the communication technique may improve the communication performance (such as the throughput) and/or security of the WLAN. Consequently, the communication technique may improve the user experience and customer satisfaction of users of the WLAN.

In the discussion that follows, electronic devices or components in a system communicate packets in accordance with a wireless communication protocol, such as: a wireless communication protocol that is compatible with an IEEE 802.11 standard (which is sometimes referred to as from the Wi-Fi Alliance of Austin, Texas), Bluetooth® (from the Bluetooth Special Interest Group of Kirkland, Washington), and/or another type of wireless interface (such as another wireless-local-area-network interface). Moreover, an access point in the system may communicate with a controller or services using a wired communication protocol, such as a wired communication protocol that is compatible with an Institute of Electrical and Electronics Engineers (IEEE) 802.3 standard (which is sometimes referred to as 'Ethernet'), e.g., an Ethernet II standard. However, a wide variety of communication protocols may be used in the system, including wired and/or wireless communication. In the discussion that follows, Ethernet and Wi-Fi are used as illustrative examples.

Figure 1:
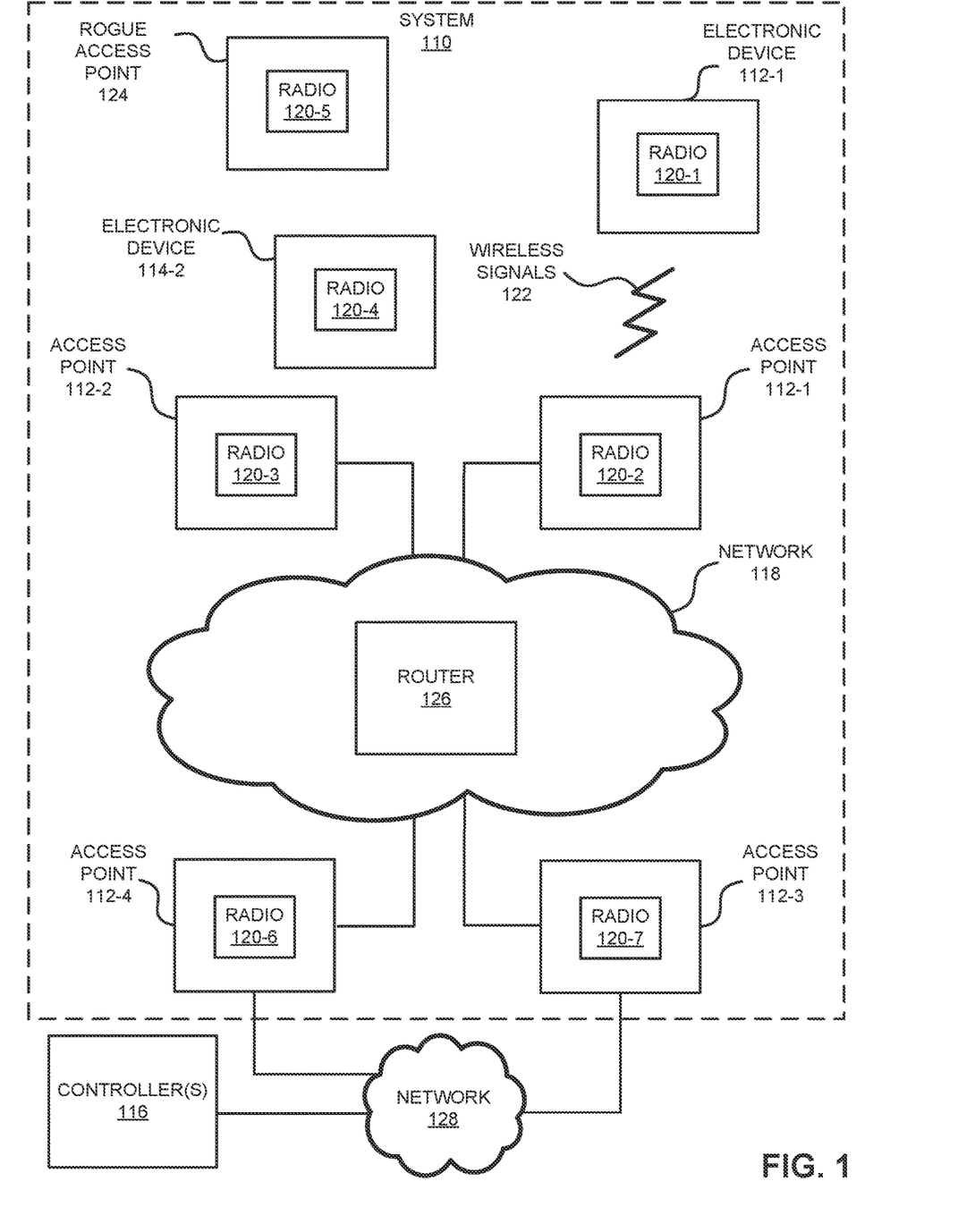
FIG. 1 is a block diagram illustrating a system in accordance with an embodiment of the present disclosure.

We now describe some embodiments of the communication techniques. FIG. 1 presents a block diagram illustrating an example of a system 110, which may include components, such as: one or more access points 112, one or more electronic devices 114 (such as cellular telephones, stations, another type of electronic device, etc.), and one or more optional controllers 116. In system 110, the one or more access points 112 may wirelessly communicate with the one or more electronic devices 114 using wireless communication that is compatible with an IEEE 802.11 standard. Thus, the wireless communication may occur in a 2.4 GHz, a 5 GHz and/or a 60 GHz frequency band. (Note that IEEE 802.11ad communication over a 60 GHz frequency band is sometimes referred to as 'WiGig.' In the present discussion, these embodiments also encompassed by 'Wi-Fi'). However, a wide variety of frequency bands may be used.

Moreover, wired and/or wireless communication among access points 112 in a WLAN may occur via network 118 (such as an intra-net, a mesh network, point-to-point connections and/or the Internet) and may use a network communication protocol, such as Ethernet. This network may include one or more routers and/or switches, such as router 126.

As noted previously, the one or more access points 112 and the one or more electronic devices 114 may communicate via wireless communication. Notably, one or more of access points 112 and one or more of electronic devices 114 may wirelessly communicate while: transmitting advertising frames on wireless channels, detecting one another by scanning wireless channels, exchanging subsequent data/management frames (such as association requests and responses) to establish a connection, configure security options (e.g., Internet Protocol Security), transmit and receive frames or packets via the connection (which may include the association requests and/or additional information as payloads), etc.

In some embodiments, the wired and/or wireless communication among access points 112 also involves the use of dedicated connections, such as via a peer-to-peer (P2P) communication technique. Therefore, access points 112 may support wired communication within the WLAN (such as Ethernet) and wireless communication within the WLAN (such as Wi-Fi), and one or more of access points 112 may also support a wired communication protocol (such as Ethernet) for communicating via network 128 (such as the Internet) with other electronic devices, such as a computer or the one or more optional controllers 116 of the WLAN. Note that the one or more optional controllers 116 may be at the same location as the other components in system 110 or may be located remotely (i.e., at a different location). Moreover, note that the one or more access points 112 may be managed by the one or more optional controllers 116. Furthermore, note that the one or more access points 112 may be a physical access point or a virtual or 'software' access point that is implemented on a computer or another electronic device.

Figure 6:
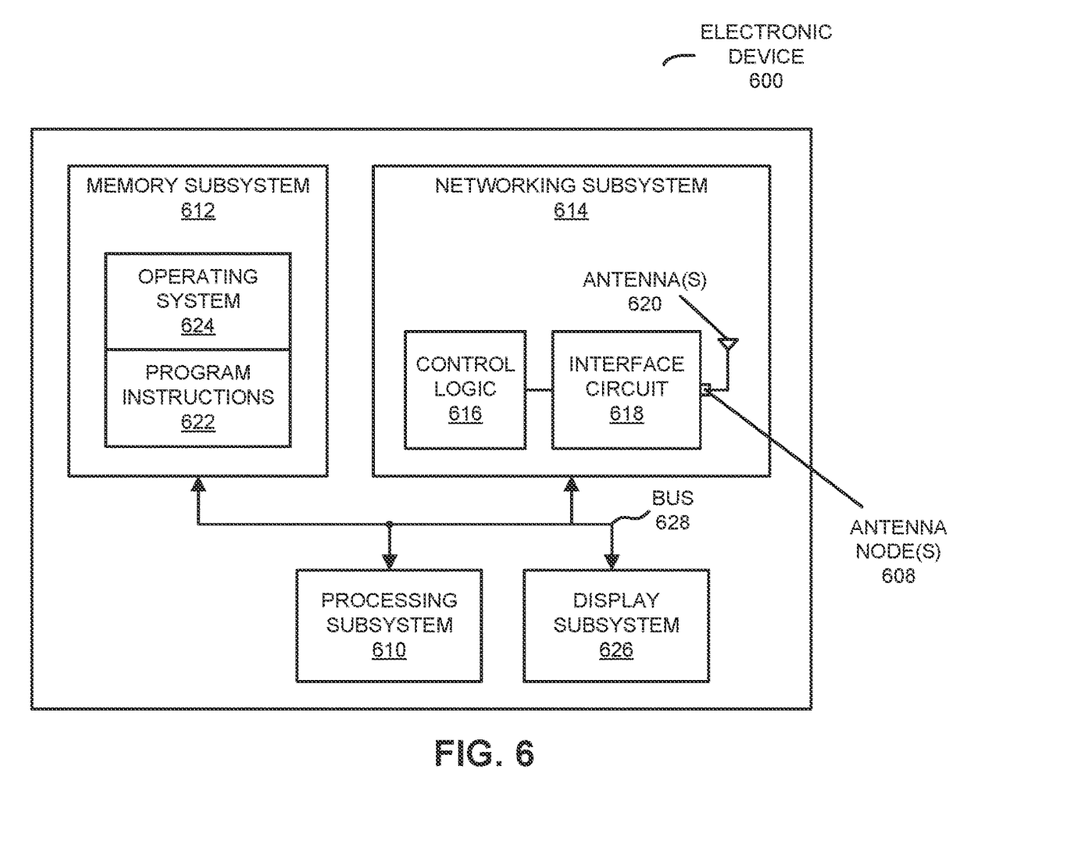
FIG. 6 is a block diagram illustrating an electronic device in accordance with an embodiment of the present disclosure.

As described further below with reference to FIG. 6, the one or more access points 112, the one or more electronic devices 114 and/or the one or more optional controllers 116 may include subsystems, such as a networking subsystem, a memory subsystem and a processor subsystem. In addition, the one or more access points 112 and the one or more electronic devices 114 may include radios 120 in the networking subsystems. More generally, the one or more access points 112 and the one or more electronic devices 114 can include (or can be included within) any electronic devices with the networking subsystems that enable the one or more access points 112 and the one or more electronic devices 114 to wirelessly communicate with each other.

As can be seen in FIG. 1, wireless signals 122 (represented by a jagged line) are transmitted from a radio 120-1 in electronic device 114-1. These wireless signals are received by radio 120-2 in at least one of the one or more access points 112, such as access point 112-1. In particular, electronic device 114-1 may transmit frames or packets. In turn, these frames or packets may be received by access point 112-1. This may allow electronic device 114-1 to communicate information to access point 112-1. Note that the communication between electronic device 114-1 and access point 112-1 may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 120 are shown in the one or more electronic devices 114 and the one or more access points 112, one or more of these instances may be different from the other instances of radios 120.

As noted previously, system 110 may include a rogue access point 124. The presence of rogue access point 124 may adversely impact security and/or the communication performance in system 110. Note that a 'rogue access point' may attempt to disable system 110 (or reduce the communication performance in the WLAN) and/or may pose a security risk to other electronic devices in system 110.

In order to address this challenge, the one or more access points 112 (such as access point 112-1) and/or one of controllers 116 may implement or use the communication techniques to facilitate coordinated attacks on rogue access point 124. Notably, as discussed further below with reference to FIGS. 2 and 3, during the communication techniques one or more of access points 112 may provide information about rogue access point 124 operating on a channel in the WLAN to one of controllers 116. In response, the one of the controllers 116 may provide instructions to at least a subset of the access points (such as access points 112-1 and 112-2), where the instructions indicate that at least the subset of the access points collaboratively attack rogue access point 124, and where a given instruction for a given access point specifies a schedule of attacks by the given access point. For example, the schedule may include time intervals (such as periodic time intervals) for the attacks by the given access point, and a remainder of the access points 112 in at least the subset of the access points 112 may attack rogue access point 124 at other time intervals (and, thus, the remainder of the access points 112 may not attack rogue access point 124 during the time intervals).

Note that, during an attack, the given access point transitions from an operating channel of the given access point to the channel on which the rogue access point 124 is operating and transmits dc-authentication messages associated with the rogue access point 124. For example, the de-authentication messages may include an identifier of the rogue access point 124 (such as a basic service set identifier or a media access control or MAC address, a service set identifier of a WLAN, etc.). The de-authentication messages may cause one or more of electronic devices 114, which are associated with rogue access point 124, to de-associate from rogue access point 124. Then, after a time interval, the given access point may transition from the channel on which the rogue access point 124 is operating to the operating channel of the given access point.

In some embodiments, the one of the controllers 116 may select at least the subset of the access points based at least in part on one or more parameters (which have been received from access points 112), including: access points that previously reported receiving transmissions associated with rogue access point 124 (i.e., access points that can hear rogue access point 124); traffic loading of at least the subset of the access points (e.g., one or more access points with lower traffic loading may be used); communication performance of at least the subset of the access points one or more access points with low utilization or reduced capacity relative to the maximum utilization or capacity may be used); a number of electronic devices associated with at least the subset of the access points (e.g., one or more access points with fewer associated electronic devices may be used); proximity of at least the subset of the access points to rogue access point 124 (which may be determined based at least in part on measured RSSIs of transmissions from rogue access point 124, such as one or more access points with the larges RSSIs for rogue access point 124); and/or whether operating channels of access points are the same as the channel on which the rogue access point 124 is operating. For example, responsibility for attacking rogue access point 124 may be dedicated to access points that have the same operating channel as the channel (i.e., that share the channel with rogue access point 124).

As described further below with reference to FIGS. 4 and 5, at least some of the aforementioned operations of the one of the controllers 116 may be performed by a given access point, such as access point 112-1. For example, access point 112-1 may receive information identifying rogue access point 124 operating on a channel in the WLAN. This information may be received from one or more of access points 112, one or more of controllers 116, and/or rogue access point 124 (e.g., access point 112 may identified, rogue access point 124 based at least in part on information received from rogue access point 124). For example, access point 112-1 may perform an off-channel scan, e.g., every 20 s and for 50 ms, and then may transition back to its operating channel to service the electronic devices 114 that are associated with access point 112-1.

Then, based at least in part on the information, access point 112-1 may provide attacks in the channel on rogue access point 112-1, where the attacks are performed in coordination with at least a subset of the access points in the WLAN (such as access point 112-2). In some embodiments, at least access point 112-1 may select at least the subset of the access points based at least in part on the one or more parameters, and may communicate assignment information to at least the subset of the access points, where the assignment information specifies at least the subset of the access points. More generally, access point 112-1 may select at least the subset of the access points.

Alternatively, the one of controllers 116 may provide the information to access point 112-1 and may indicate that access point 112-1 is included in at least the subset of the access points. In response, access point 112-1 may provide one or more requests to one or more of the access points 112, where a given request indicates that a given one of the one or more of the access points 112 replace access point 112-1 in at least the subset of the access points take over responsibility for attacking rogue access point 124 from access point 112-1). Note that access point 112-1 may determine the one or more of the access points 112 to which it provides the one or more requests based at least in part on the one or more parameters (which may be exchanged with the one or more access points 112 and/or received from the one of the controllers 116).

In these ways, the communication techniques may facilitate collaborative attacks on rogue access point 124. This may reduce or eliminate harm caused by rogue access point 124. Therefore, the communication techniques may improve the security and/or the communication performance in system 110.

In the described embodiments, processing a frame or a packet in the electronic devices and/or the one or more access points may include: receiving wireless signals 122 with the frame or packet; decoding/extracting the frame or packet from the received wireless signals 122 to acquire the frame or packet; and processing the frame or packet to determine information contained in the frame or packet.

Although we describe the network environment shown in FIG. 1 as an example, in alternative embodiments, different numbers or types of electronic devices or components may be present. For example, some embodiments comprise more or fewer electronic devices or components. Therefore, in some embodiments there may be fewer or additional instances of at least some of the one or more access points 112, the one or more electronic devices 114, the one or more optional controllers 116 and/or rogue access point 124. As another example, in another embodiment, different electronic devices are transmitting and/or receiving frames or packets.

Figure 2:
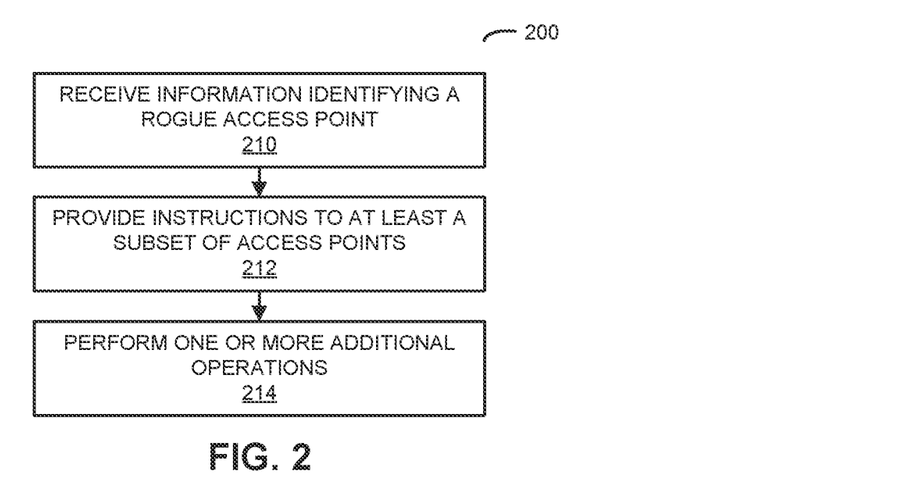
FIG. 2 is a flow diagram illustrating a method for facilitating collaborative attacks on a rogue access point in the system in FIG. 1 in accordance with an embodiment of the present disclosure.

We now describe embodiments of the method. FIG. 2 presents a flow diagram illustrating an example of a method 200 for facilitating collaborative attacks on a rogue access point. Moreover, method 200 may be performed by a controller, such as one of the controllers 116 in FIG. 1. During operation, the controller may receive information identifying a rogue access point (operation 210) operating on a channel in the WLAN. Note that the information may be provided by one or more of the access points.

In response, the controller may provide instructions to at least a subset of the access points (operation 212), where the instructions indicate that at least the subset of the access points collaboratively attack the rogue access point, and where a given instruction for a given access point specifies a schedule of attacks by the given access point. The schedule may include time intervals when the given access point attacks the rogue access point. For example, the time intervals may be periodic. When the given access point attacks the rogue access point, note that a remainder of the access points in at least the subset of the access points may not attack the rogue access point.

Furthermore, the given instruction may indicate that, during an instance of an attack, the given access point transitions from an operating channel of the given access point to the channel on which the rogue access point 124 is operating and transmits de-authentication messages associated with the rogue access point (such as broadcast de-authentication messages). For example, the de-authentication messages may include an identifier of the rogue access point. Then, after a time interval, the given access point may transition from the channel on which the rogue access point 124 is operating to the operating channel of the given access point.

In some embodiments, the controller optionally performs one or more additional operations (operation 214). Notably, the controller may select at least the subset of the access points. For example, at least the subset of the access points may have previously reported receiving transmissions associated with the rogue access point. Alternatively, the controller may select at least the subset of the access points based at least in part on one or more of: traffic loading of at least the subset of the access points; communication performance of at least the subset of the access points; a number of electronic devices associated with at least the subset of the access points; and/or proximity of at least the subset of the access points to the rogue access point (which may be determined using received signal strengths of the rogue access point by at least the subset of the access points). In some embodiments, operating channels of at least the subset of the access points are the same as the channel.

While FIG. 2 illustrates the controller performing the operations in method 200, as described further below, in other embodiments at least some of the operations in method 200 are performed by an access point. Moreover, while FIG. 2 illustrates the use of method 200 in a WLAN, in other embodiments method 200 may be used in a wired network.

Figure 3:
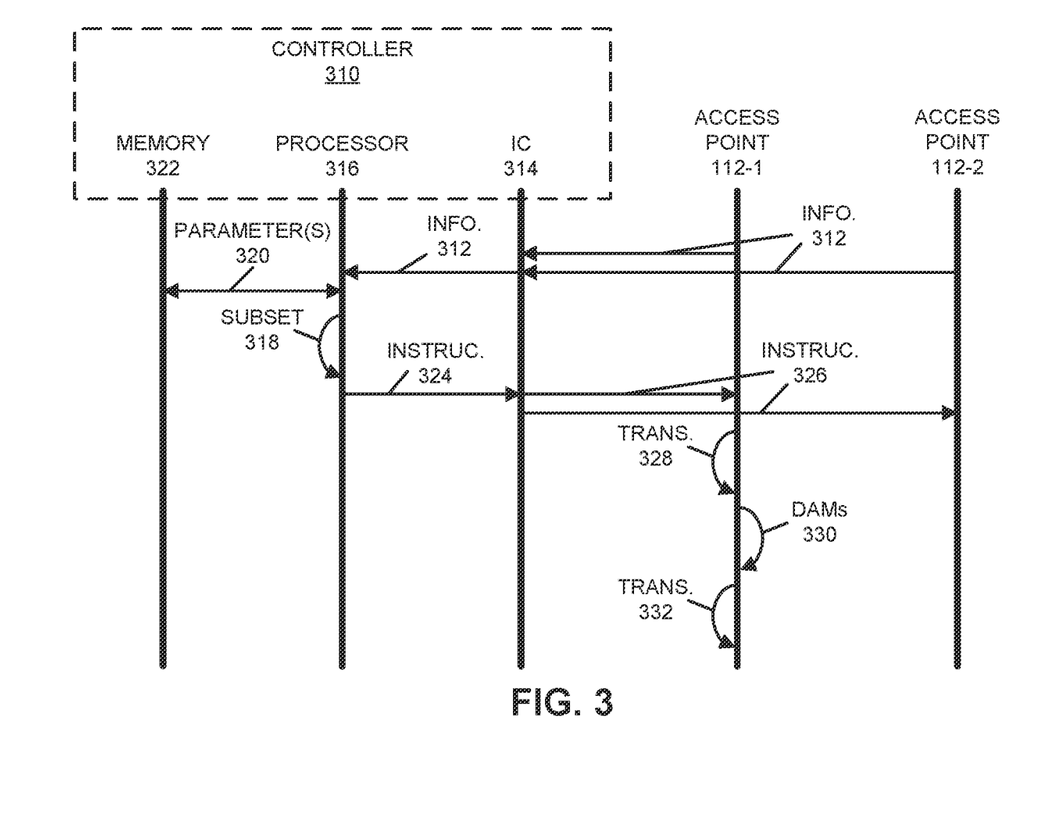
FIG. 3 is a drawing illustrating an example of communication among electronic devices in FIG. 1 in accordance with an embodiment of the present disclosure.

Embodiments of the communication techniques are further illustrated in FIG. 3, which presents a drawing illustrating an example of communication between access point 112-1, access point 112-2, and a controller 310 according to some embodiments. Notably, access points 112-1 and 112-2 may provide information 312 about rogue access point 124 operating on a channel in a WLAN to controller 310. For example, a given access point (such as access point 112-1) may identify rogue access point 124 based at least in part, on manufacturer-specific information that is included in a transmitted packet or a frame. When a packet or a frame without the manufacturer-specific information is received during a channel scan, the given access point may identify rogue access point 124 (FIG. 1), which may be employing: a service set identifier spoof, a MAC address spoof, etc.

After receiving information 312, interface circuit (IC) 314 in controller 310 may provide information 312 to a processor 316 in controller 310. Then, processor 316 may select at least the subset 318 of the access points. In order to select at least the subset 318, processor 316 may access information (such as one or more parameters 320) about at least one or more of access points 112, which may be stored in memory 322 in controller 310. Moreover, processor 316 may select at least the subset 318 based at least in part on the one or more parameters 320.

Next, processor 316 may instruct 324 interface circuit 314 to provide instructions 326 to at least the subset 318 (such as access points 112-1 and 112-2). These instructions may indicate that at least the subset 318 collaboratively attack rogue access point 124, and may specify a schedule of attacks by the different access points.

After receiving instructions 326, access points 112-1 and 112-2 may periodically (and at different time intervals) attack rogue access point 124. For example, during an instance of an attack in a time interval, access point 112-1 may transition 328 from an operating channel of access point 112-1 to the channel on which the rogue access point 124 is operating and may transmit de-authentication messages (DAMS) 330 associated with rogue access point 124. Then, after the time interval, access point 112-1 may transition 332 from the channel on which the rogue access point 124 is operating to the operating channel of access point 112-1.

Figure 4:
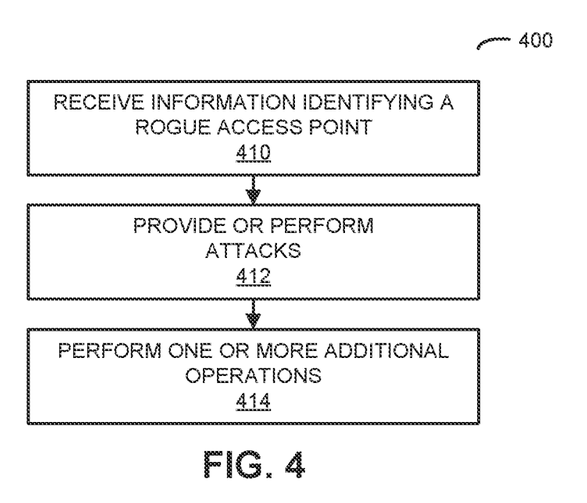
FIG. 4 is a flow diagram illustrating a method for facilitating collaborative attacks on a rogue access point in the system in FIG. 1 in accordance with an embodiment of the present disclosure.

FIG. 4 presents a flow diagram illustrating an example of a method 400 for facilitating collaborative attacks on a rogue access point. Moreover, method 400 may be performed by an access point, such as one of access points 112 in FIG. 1 (e.g., access point 112-1). During operation, the access point may receive information identifying a rogue access point (operation 410) operating on a channel in a WLAN. Note that the information may be associated with (e.g., received from) a controller and/or from at least a subset of the access points. Alternatively, the access point may receive the information from the rogue access point, and the access point may identify the rogue access point based at least in part on the information.

Then, based at least in part on the information, the access point may provide or perform attacks (operation 412) in the channel on the rogue access point, where the attacks are performed in coordination with at least the subset of the access points. Moreover, the information may include a schedule with time interval when the access point attacks the rogue access point. For example, the time intervals may be periodic. When the access point attacks the rogue access point, note that a remainder of the access points in at least the subset of the access points may not attack the rogue access point. Furthermore, the instruction may indicate that, during an instance of an attack, the access point transitions from an operating channel of the access point to the channel and transmits de-authentication messages associated with the rogue access point (such as broadcast de-authentication messages) on the channel on which the rogue access point 124 is operating. For example, the de-authentication messages may include an identifier of the rogue access point. Then, after a time interval, the access point may transition from the channel to the operating channel of the access point.

In some embodiments, the access point optionally performs one or more additional operations (operation 414). Notably, the access point may select at least the subset of the access points, and may communicate assignment information to at least the subset of the access points, where the assignment information specifies at least the subset of the access points. Note that access point may select at least the subset of the access points independently or in conjunction with one or more of the access points.

For example, the access point may select at least the subset of the access points based at least in part on: access points that have previously reported receiving transmissions associated with the rogue access point; traffic loading of at least the subset of the access points; communication performance of at least the subset of the access points; a number of electronic devices associated with at least the subset of the access points; and/or proximity of at least the subset of the access points to the rogue access point (which may be determined using received signal strengths of the rogue access point by at least the subset of the access points). In some embodiments, the access point selects access points for inclusion in at least the subset of the access points because they have operating channels that are the same as the channel.

Alternatively, when the information is associated with the controller and indicates that the access point is included in at least the subset of the access points, the access point may provide one or more requests to one or more of the access points, where a given request indicates that a given one of the one or more of the access points replace the access point in at least the subset of the access points. For example, the access point may determine when to provide the one or more requests based at least in part on: when the one or more of the access points have previously reported receiving transmissions associated with the rogue access point; a comparison of loading of the one or more of the access points and the access point; a comparison of communication performance of the one or more of the access points and the access point; numbers of electronic devices associated with the one or more of the access points and the access point; relative proximity of the one or more of the access points and the access point to the rogue access point; and/or when one or more operating channels of at least the one or more of the access points are the same as the channel.

In some embodiments of methods 200 (FIG. 2) and/or 400, there may be additional or fewer operations. Moreover, the order of the operations may be changed, and/or two or more operations may be combined into a single operation.

For example, while FIG. 4 illustrates the access point performing the operations in method 400, as described previously, in other embodiments at least some of the operations in method 400 are performed by a controller. Moreover, while FIG. 4 illustrates the use of method 400 in a WLAN, in other embodiments method 400 may be used in a wired network.

Figure 5:
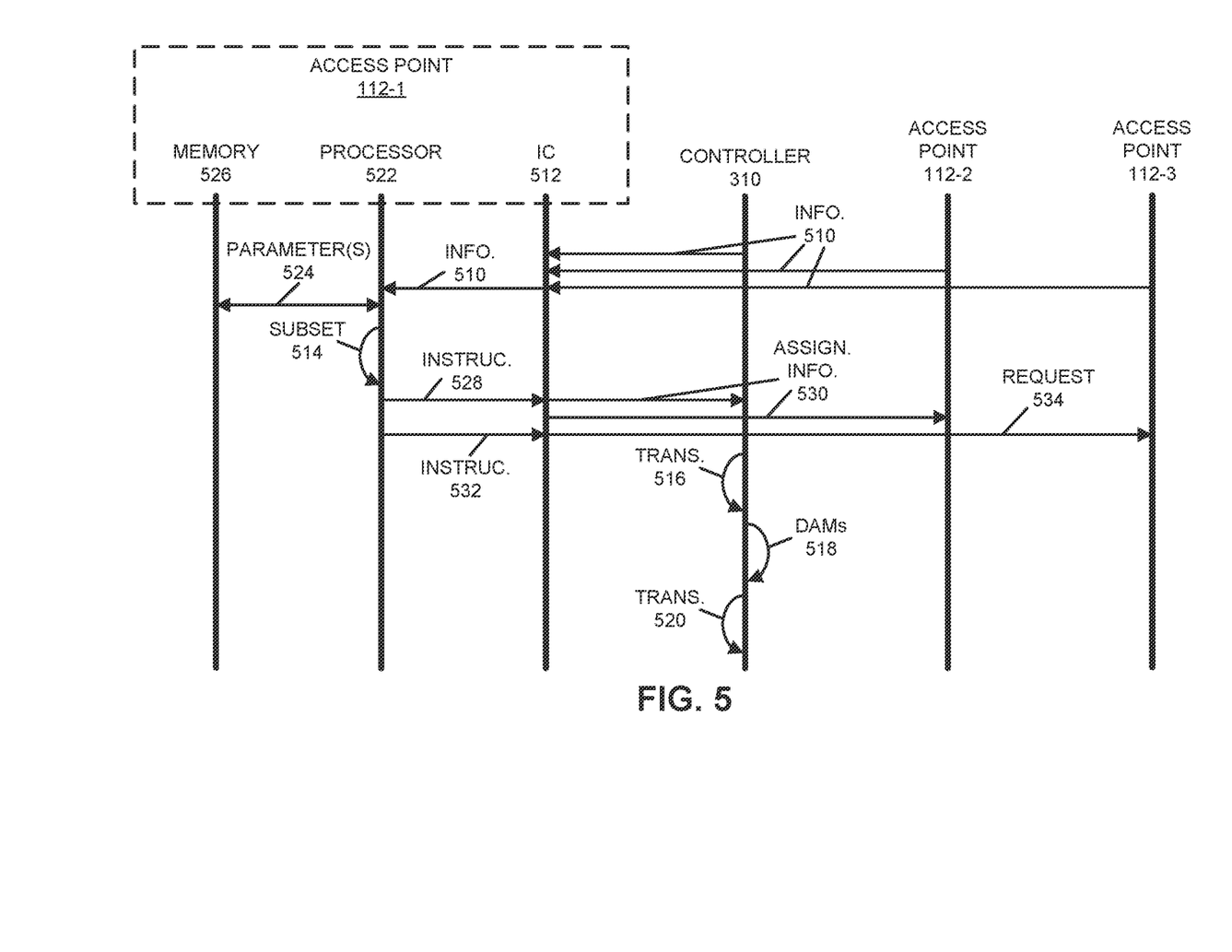
FIG. 5 is a drawing illustrating an example of communication among electronic devices in FIG. 1 in accordance with an embodiment of the present disclosure.

Embodiments of the communication techniques are further illustrated in FIG. 5, which presents a drawing illustrating an example of communication between access point 112-1, access point and 112-2, access point 112-3, and/or controller 310 according to some embodiments. Notably, access points 112-2 and 112-3, or controller 310 may provide information 510 to access point 112-1 identifying rogue access point 124 (FIG. 1) operating on a channel in a WLAN. Alternatively, in some embodiments, one or more of access points 112 may receive information 510 from rogue access point 124, and may identify rogue access point 124 based at least in part on information 510.

For example, access point 112-2 may identify rogue access point 124 based at least in part on manufacturer-specific information that is included in a transmitted packet or a frame. When a packet or a frame without the manufacturer-specific information is received during a channel scan, access point 112-2 may identify rogue access point 124, which may be employing: a service set identifier spoof, a MAC address spoof, etc. Then, access point 112-2 may provide information 510 to access point 112-1, or may provide information 510 to controller 310, which may provide information 510 to access point 112-1.

After receiving information 510, interface circuit (IC) 512 in access point 112-1 may perform attacks in the channel on rogue access point 124 based at least in part on information 510, where the attacks are performed in coordination with at least a subset 514 of the access points (such as access point 112-2).

For example, information 510 may specify a schedule of attacks by the different access points. In response, access points 112-1 and 112-2 may periodically (and at different time intervals) attack rogue access point 124. Notably, during an instance of an attack in a time interval, access point 112-1 may transition 516 from an operating channel of access point 112-1 to the channel and may transmit de-authentication messages (DAMs) 518 associated with rogue access point 124. Then, after the time interval, access point 112-1 may transition 520 from the channel to the operating channel of access point 112-1.

In some embodiments, access point 112-1 may select at least the subset 514 of the access points, in order to select at least the subset 514, interface circuit 512 may provide information 510 to a processor 522 in access point 112-1. Then, processor 522 may access information (such as one or more parameters 524) about at least the subset 514, which may be stored in memory 526 in access point 112-1. Moreover, processor 522 may select at least the subset 514 based at least in part on the one or more parameters 524. Next, processor 522 may instruct 528 interface circuit 512 to provide assignment information 530 to at least the subset 514 (such as access point 112-2).

Alternatively, when information 510 indicates that access point 112-1 is included in at least the subset 514, processor 522 may instruct 532 interface circuit 512 to provide a request 534 to access point 112-3 to replace access point 112-1 in at least the subset 514. Note that access point 112-1 may determine to provide request 534 to access point 112-3 based at least in part on the one or more parameters 524.

While FIGS. 3 and 5 illustrate communication between components using unidirectional or bidirectional communication with lines having single arrows or double arrows, in general the communication in a given operation in this figure may involve unidirectional or bidirectional communication.

In some embodiments of the communication techniques, an access point may perform periodic rogue access-point detection and may report, rogue access-point information to a controller. In response, the controller may configure the access point to perform or provide broadcast de-authorization messages to clients of the rogue access point using the rogue access points basic service set identifier and service set identifier.

Note that the access point may send broadcast de-authorization messages based at least in part on the configuration provided by the controller. Notably, the configuration may specify an aggressive mode in which a de-authorization message is broadcast, e.g., every 2 s. During a scan cycle, when the access point switches its operating; channel to the channel of the rogue access point, the access point may then send a de-authorization message. Note that if there are no electronic devices connected to or associated with the access point, the access point may send de-authorization messages more frequently.

However, in this approach, the access point may send de-authorization messages even when the rogue access point uses a different channel and/or the access point is busy. Consequently, the throughput and user experience may be adversely affected.

In some embodiments, if the same rogue access-point information is shared by multiple access points, then the controller may configure these access points to perform or provide de-authorization messages (i.e., to attack the rogue access point). However, if the detected rogue access point is located far away or some distance from an access point, it may not be that useful for this access point to provide de-authorization messages, because the de-authorization messages from this access point may not be effective in de-authenticating electronic devices that are connected to or associated with the rogue access point. Moreover, if too many access points are configured to attack the rogue access point, there may be too many de-authorization messages or frames broadcast, which may waste network capacity and which may adversely impact throughput. Furthermore, in this approach, de-authorization messages may be provided without knowing whether any electronic devices are connected to or associated with the rogue access point. Additionally, if the access points continue to report the same rogue access point, the controller may repeatedly configure the access points to send de-authorization messages.

These problems may be addressed using the communication techniques. Notably, in some embodiments, the access points may periodically detect one or more rogue access points and report rogue access-point information to the controller. During this process, the controller may collect information such as: which access points are able to see or receive wireless transmissions from a given rogue access point; service information about the access points (es., their current channel, maximum capacity, available capacity, current capacity, number of connected electronic devices, and/or the volume of traffic or utilization between the access points and the electronic devices connected to them); and/or the RSSIs of the rogue access point at the access points.

Using this information, the controller may assign at least a subset of the access points to periodically send de-authorization messages. Note that by using multiple access points to provide or perform the attacks, the broadcast de-authentication messages may be more effective (e.g., the electronic devices connected to or associated with the rogue access point may be more likely to respond to the broadcast de-authentication messages). Moreover, when feasible, the controller may designate one or more of the access points to operate on the channel of the rogue access point. Because these access points will operate on the same channel, they may monitor the rogue access point to observe if any electronic devices are connected to the rogue access point and any data that is transferred between the rogue access point and the electronic devices that are connected with it. Based at least in part on this information, the controller may determine whether to configure the de-authorization messages or not.

Alternatively, in some embodiments, the access points may periodically detect one or more rogue access points and may report rogue access-point information to the controller. Then, the controller may configure an access point to periodically send broadcast de-authorization messages. Upon receiving the configuration, the access point may: check its available capacity is lesser than neighboring access point (e.g., with a headroom or 10 or 25%); determine if the number of electronic devices connected to the access point is higher compared to the neighboring access points; and/or determine if any of the neighboring access points are operating in the same channel as the rogue access point. In these cases, the access point may ask one or more of the neighboring access points whether they can see the rogue access point, the measured RRSI of the rogue access point, and whether there are any electronic devices connected to the rogue access point. The one or more neighboring access points may respond to this request. Upon receiving the response(s), the access point may compare the collected information and may determine if one or more of the neighboring access points can be designated to periodically send broadcast de-authorization messages on behalf of the access point. Note that, unless there is a change (such as in the channel of the rogue access point or other information), after the initial report, the access point may stop reporting the rogue access point to the controller.

The communication techniques may reduce overhead on the access points, thereby enhancing throughput and improving the user experience. Moreover, the communication techniques may reduce unnecessary broadcast de-authorization messages and may reduce communication between the access points and the controller about the rogue access point.

We now describe embodiments of an electronic device, which may perform at least some of the operations in the communication techniques. For example, the electronic device may include a component in system 110, such as one of: the one or more access points 112, the one or more electronic devices 114 and/or the one or more optional controllers 116. FIG. 6 presents a block diagram illustrating an electronic device 600 in accordance with some embodiments. This electronic device includes processing subsystem 610, memory subsystem 612, and networking subsystem 614. Processing subsystem 610 includes one or more devices configured to perform computational operations. For example, processing subsystem 610 can include one or more microprocessors, ASICs, microcontrollers, programmable-logic devices, graphical processor units (GPUs) and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory (which collectively or individually are sometimes referred to as a 'computer-readable storage medium'). In some embodiments, instructions for processing subsystem 610 in memory subsystem 612 include: one or more program modules or sets of instructions (such as program instructions 622 or operating system 624), which may be executed by processing subsystem 610. Note that the one or more computer programs may constitute a computer-program mechanism. Moreover, instructions in the various program instructions in memory subsystem 612 may be implemented in: a high-level procedural language, an object-oriented programming language, and/or in an assembly or machine language. Furthermore, the programming language may be compiled or interpreted, e.g., configurable or configured (which be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and one or more antennas 620 (or antenna elements). (While FIG. 6 includes one or more antennas 620, in some embodiments electronic device 600 includes one or more nodes, such as nodes 608, e.g., a pad, which can be coupled to the one or more antennas 620. Thus, electronic device 600 may or may not include the one or more antennas 620.) For example, networking subsystem 614 can include a Bluetooth networking system, a cellular networking system (e.g., a 3G/4G/5G network such as UMTS, LTE, etc.), a USB networking system, a networking system based on the standards described in IEEE 802.11 (e.g., a Wi-Fi networking system), an Ethernet networking system, and/or another networking system.

In some embodiments, a transmit antenna radiation pattern of electronic device 600 may be adapted or changed using pattern shapers (such as reflectors) in one or more antennas 620 (or antenna elements), which can be independently and selectively electrically coupled to ground to steer the transmit antenna radiation pattern in different directions. Thus, if one or more antennas 620 includes N antenna-radiation-pattern shapers, the one or more antennas 620 may have $2^N$ different antenna-radiation-pattern configurations. More generally, a given antenna radiation pattern may include amplitudes and/or phases of signals that specify a direction of the main or primary lobe of the given antenna radiation pattern, as well as so-called 'exclusion regions' or 'exclusion zones' (which are sometimes referred to as 'notches' or 'nulls'). Note that an exclusion zone of the given antenna radiation pattern includes a low-intensity region of the given antenna radiation pattern. While the intensity is not necessarily zero in the exclusion zone, it may be below a threshold, such as 4 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting frames and/or scanning for frames transmitted by other electronic devices.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc.

Electronic device 600 can be (or can be included in) any electronic device with at least one network interface. For example, electronic device 600 can be (or can be included in): a desktop computer, a laptop computer, a subnotebook/netbook, a server, a computer, a mainframe computer, a cloud-based computer, a tablet computer, a smartphone, a cellular telephone, a smartwatch, a consumer-electronic device, a portable computing device, an access point, a transceiver, a controller, a radio node, a router, a switch, communication equipment, an access point, test equipment, and/or another electronic device.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in electronic device 600. For example, in some embodiments program instructions 622 is included in operating system 624 and/or control logic 616 is included in interface circuit 618.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit' or a 'means for communication') may implement some or all of the functionality of networking subsystem 614. The integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals).

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 622, operating system 624 (such as a driver for interface circuit 618) or in firmware in interface circuit 618. Alternatively or additionally, at least some of the operations in the communication techniques may be implemented in a physical layer, such as hardware in interface circuit 618.

Moreover, while the preceding embodiments illustrated the use of wireless signals in one or more bands of frequencies, in other embodiments of these signals may be communicated in one or more bands of frequencies, including: a microwave frequency band, a radar frequency hand, 900 MHz, 2.4 GHz, 5 GHz, 60 GHz, and/or a band of frequencies used by a Citizens Broadband Radio Service or by LTE. In some embodiments, the communication between electronic devices uses multi-user transmission (such as orthogonal frequency division multiple access or OFDMA).

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication techniques, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A controller, comprising:
an interface circuit configured to communicate with access points in a wireless local area network (WLAN), wherein the controller is configured to:
receive, at the interface circuit, information identifying a rogue access point operating on a channel in the WLAN; and
provide, from the interface circuit, instructions addressed to at least a subset of the access points, wherein the instructions indicate that at least the subset of the access points collaboratively attack the rogue access point, and
wherein a given instruction for a given access point specifies a schedule of attacks by the given access point.

2. The controller of claim 1, wherein the information is associated with one or more of the access points.

3. The controller of claim 1, wherein the schedule comprises time intervals when the given access point attacks the rogue access point; and wherein, when the given access point attacks the rogue access point, a remainder of the access points in at least the subset of the access points do not attack the rogue access point.

4. The controller of claim 1, wherein the given instruction indicates that, during an instance of an attack, the given access point:
   transitions from an operating channel of the given access point to the channel;
   transmits de-authentication messages associated with the rogue access point; and
   transitions from the channel to the operating channel of the given access point.

5. The controller of claim 1, wherein the controller is configured to select at least the subset of the access points.

6. The controller of claim 5, wherein at least the subset of the access points is selected based at least in part on one of more of: at least the subset of the access points having previously reported receiving transmissions associated with the rogue access point; traffic loading of at least the subset of the access points; communication performance of at least the subset of the access points; a number of electronic devices associated with at least the subset of the access points; or proximity of at least the subset of the access points to the rogue access point.

7. The controller of claim 1, wherein the controller is configured to select at least the subset of the access points having operating channels that are the same as the channel.

8. A non-transitory computer-readable storage medium for use in conjunction with a controller, the computer-readable storage medium storing program instructions that, when executed by the controller, cause the controller to perform operations, comprising:
   receiving, at an interface circuit, information identifying a rogue access point operating on a channel in a wireless local area network (WLAN); and
   providing, from the interface circuit, instructions addressed to at least a subset of access points, wherein the instructions indicate that at least the subset of the access points collaboratively attack the rogue access point, and
   wherein a given instruction for a given access point specifies a schedule of attacks by the given access point.

9. The non-transitory computer-readable storage medium of claim 8, wherein the information is associated with one or more of the access points.

10. The non-transitory computer-readable storage medium of claim 8, wherein the schedule comprises time intervals when the given access point attacks the rogue access point; and
   wherein, when the given access point attacks the rogue access point, a remainder of the access points in at least the subset of the access points do not attack the rogue access point.

11. The non-transitory computer-readable storage medium of claim 8, wherein the given instruction indicates that, during an instance of an attack, the given access point:
   transitions from an operating channel of the given access point to the channel;
   transmits de-authentication messages associated with the rogue access point; and
   transitions from the channel to the operating channel of the given access point.

12. The non-transitory computer-readable storage medium of claim 8, wherein the operations comprise selecting at least the subset of the access points.

13. The non-transitory computer-readable storage medium of claim 12, wherein at least the subset of the access points is selected based at least in part on one of more of: at least the subset of the access points having previously reported receiving transmissions associated with the rogue access point; traffic loading of at least the subset of the access points; communication performance of at least the subset of the access points; a number of electronic devices associated with at least the subset of the access points; or proximity of at least the subset of the access points to the rogue access point.

14. The non-transitory computer-readable storage medium of claim 8, wherein the operations comprise selecting at least the subset of the access points having operating channels that are the same as the channel.

15. A method for facilitating collaborative attacks on a rouge rogue access point, comprising:
   by a controller;
   receiving, at an interface circuit, information identifying a rogue access point operating on a channel in a wireless local area network (WLAN); and
   providing, from the interface circuit, instructions addressed to at least a subset of access points, wherein the instructions indicate that at least the subset of the access points collaboratively attack the rogue access point, and
   wherein a given instruction for a given access point specifies a schedule of attacks by the given access point.

16. The method of claim 15, wherein the information is associated with one or more of the access points.

17. The method of claim 15, wherein the schedule comprises time intervals when the given access point attacks the rogue access point; and
   wherein, when the given access point attacks the rogue access point, a remainder of the access points in at least the subset of the access points do not attack the rogue access point.

18. The method of claim 15, wherein the given instruction indicates that, during an instance of an attack, the given access point:
   transitions from an operating channel of the given access point to the channel;
   transmits de-authentication messages associated with the rogue access point; and
   transitions from the channel to the operating channel of the given access point.

19. The method of claim 15, wherein the method comprises selecting at least the subset of the access points; and
   wherein at least the subset of the access points is selected based at least in part on one of more of: at least the subset of the access points having previously reported receiving transmissions associated with the rogue access point; traffic loading of at least the subset of the access points; communication performance of at least the subset of the access points; a number of electronic devices associated with at least the subset of the access points; or proximity of at least the subset of the access points to the rogue access point.

20. The method of claim 15, wherein the method comprises selecting at least the subset of the access points having operating channels that are the same as the channel.

* * * * *